(12) United States Patent
Johann

(10) Patent No.: US 8,980,095 B2
(45) Date of Patent: Mar. 17, 2015

(54) PROCESS AND SYSTEM FOR TREATING WATER

(75) Inventor: Jürgen Johann, Nussloch (DE)

(73) Assignee: BWT Aktiengesellschaft (AT)

( * ) Notice: Subject to any disclaimer, the term of this patent is extended or adjusted under 35 U.S.C. 154(b) by 231 days.

(21) Appl. No.: 13/812,215

(22) PCT Filed: Jul. 22, 2011

(86) PCT No.: PCT/EP2011/062628
§ 371 (c)(1),
(2), (4) Date: Jan. 25, 2013

(87) PCT Pub. No.: WO2012/013593
PCT Pub. Date: Feb. 2, 2012

(65) Prior Publication Data
US 2013/0118984 A1 May 16, 2013

(30) Foreign Application Priority Data
Jul. 26, 2010 (DE) .......................... 10 2010 032 722

(51) Int. Cl.
*C02F 1/42* (2006.01)
*C02F 9/00* (2006.01)
(Continued)

(52) U.S. Cl.
CPC ............. *C02F 9/00* (2013.01); *B01D 61/025* (2013.01); *B01D 61/04* (2013.01); *C02F 1/42* (2013.01);
(Continued)

(58) Field of Classification Search
CPC ............. C02F 2103/04; C02F 2209/06; C02F 2209/07; C02F 5/00; B01D 15/00; B01D 15/08; B01D 15/10; B01D 15/12; B01D 15/18; B01D 15/1807; B01D 15/1814; B01D 15/36; B01D 15/361; B01D 15/362; B01D 15/363; B01J 39/00; B01J 41/00; B23H 1/10
USPC .................. 210/638, 652, 748.01, 639, 743; 204/522, 525, 523, 529, 536, 524
See application file for complete search history.

(56) References Cited

U.S. PATENT DOCUMENTS 5,246,586 A 9/1993 Ban et al.
6,267,891 B1 7/2001 Tonelli et al.
(Continued)

FOREIGN PATENT DOCUMENTS

DE  35 43 661 A   6/1987
DE  42 22 586 A1  7/1993
EP  0 946 268 A1  10/1999

*Primary Examiner* — Allison Fitzsimmons
(74) *Attorney, Agent, or Firm* — DLA Piper LLP (US)

(57) ABSTRACT

A process for producing ultrapure water, in which a stream of water is purified in a reverse osmosis device, wherein the water stream is subject to pretreatment including splitting the water stream into at least two partial streams, partial exchange of cations present in at least one of the partial streams for $H^+$ ions by a cation exchanger operated in the $H^+$ mode, and complete exchange of the anions present in at least one further of the partial streams for $OH^-$ ions by a softener operative in parallel to the cation exchanger, and treating the partial streams treated by the cation exchanger and the softener by at least one anion exchanger operating in the $OH^-$ mode, and wherein the water stream obtained from the pretreatment is fed into the reverse osmosis device.

11 Claims, 1 Drawing Sheet

(51) Int. Cl.
*B01D 61/02* (2006.01)
*B01D 61/04* (2006.01)
*C02F 1/44* (2006.01)
B01D 15/10 (2006.01)
C02F 1/66 (2006.01)
C02F 5/00 (2006.01)
C02F 103/04 (2006.01)

(52) U.S. Cl.
CPC ............ *C02F 1/441* (2013.01); *B01D 2311/04* (2013.01); *B01D 2311/2623* (2013.01); *C02F 1/66* (2013.01); *C02F 5/00* (2013.01); *C02F 2001/422* (2013.01); *C02F 2001/425* (2013.01); *C02F 2103/04* (2013.01); *C02F 2301/043* (2013.01)
USPC ...... 210/638; 210/652; 210/748.01; 210/639; 210/743; 204/522; 204/525; 204/523; 204/529; 204/524

(56) References Cited

U.S. PATENT DOCUMENTS

| 8,217,296 | B2 * | 7/2012 | Kawarai et al. | ............ 219/69.14 |
| 2002/0125191 | A1 | 9/2002 | Mukhopadhyay | |
| 2008/0053918 | A1 * | 3/2008 | Murphy | ........................ 210/743 |

* cited by examiner

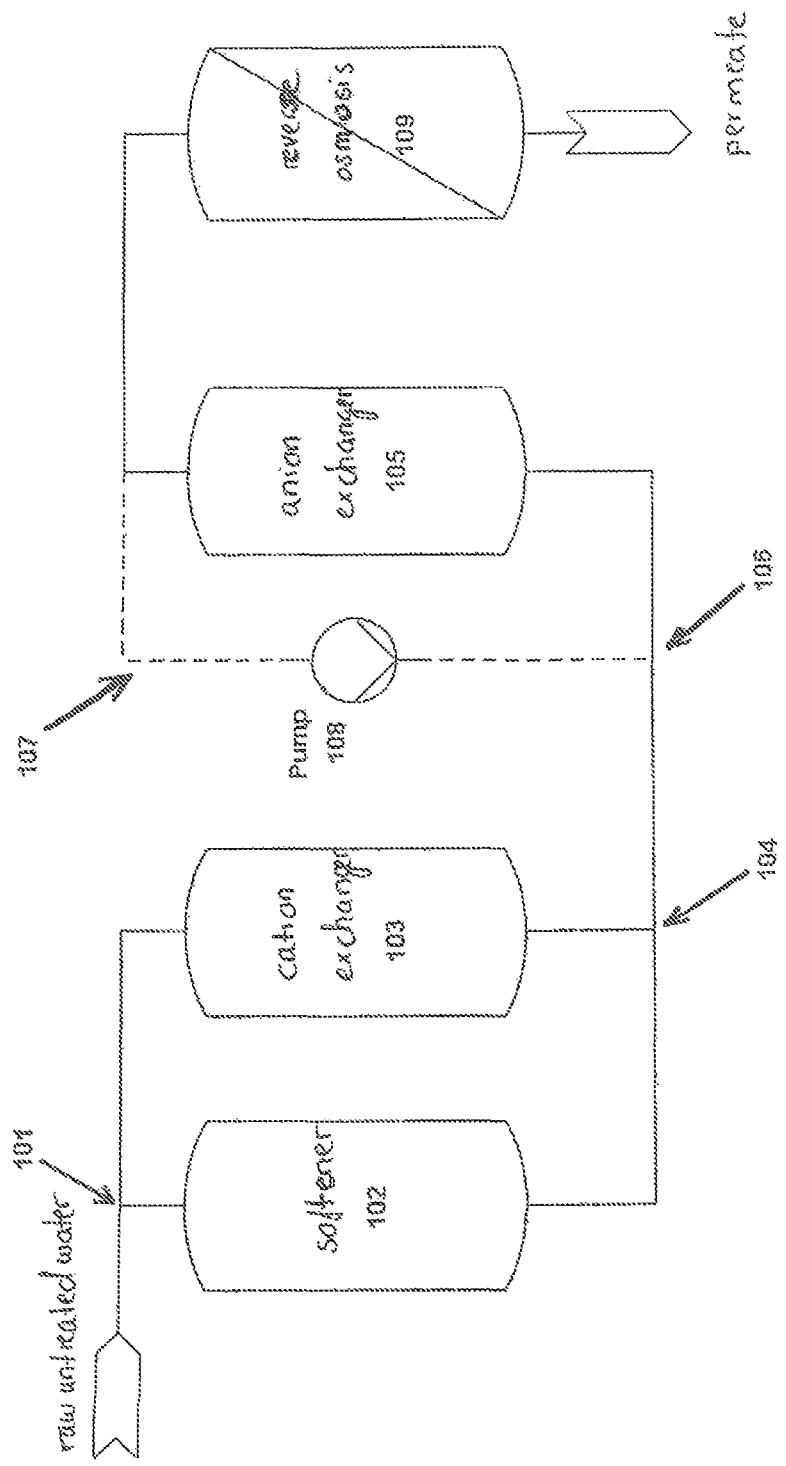

PROCESS AND SYSTEM FOR TREATING WATER

The present invention is related to a process for treating water, in which a stream of water is purified in a reverse osmosis device. Further, the present invention is related to a system for carrying out such a process.

In the present times, the treatment of water is of increasing importance, in particular in the field of potable water supply and the production of ultrapure process waters. Specifically in the latter case, there are particularly high requirements of water purity, for example in the case of process waters intended for use in pharmaceutical utilizations or for applications in semiconductor production.

In the course of water treatment for such applications, in particular the per se well-known process of reverse osmosis is employed. During the procedure, the water to be treated is pressurized and conducted along a water permeable membrane, wherein the water passes the membrane as a permeate and most of the molecular and ionic impurities present in the water are retained by the permselective membrane. Thus, the water to be treated is separated into a partial stream (permeate) low in salt and a partial stream (concentrate) rich in salt.

However, the separation of non-ionic or hardly ionizable compounds, like carbon dioxide ($CO_2$) or silicon dioxide ($SiO_2$) for example, proves to be difficult. In general, such species cannot or merely to an inadequate extent be removed from pH neutral water streams by means of reverse osmosis. Therefore, usually an alkali (caustic soda, for example) is added to the water to be treated prior to feeding it to a reverse osmosis device. As a general rule, at a higher pH value, a much higher proportion of the hard to remove species is present in an ionized form. Said ionized proportion may in general exhibit improved separation using reverse osmosis membranes. Another advantage resulting from an increased pH value, in particular higher pH values>10 in the water supply prior to the reverse osmosis is a decreased disposition to membrane fouling. The term membrane fouling is to describe the immobilization of bacteria on a membrane surface. The growing biofilm is able to reduce the permeate performance. Furthermore, the permeate may be subject to bacterial contamination.

A method for operating high-efficient reverse osmosis is known from EP 0 946 268, wherein a stream of raw untreated water is pretreated during one or more steps and subsequently is fed into a reverse osmosis unit. However, prior to feeding the pretreated raw water stream, the pH value of the water is increased to at least 8,5, in preferred embodiments even to 12 or more. The method allows an efficient separation of low ionized molecular species in the reverse osmosis unit. Furthermore, in combination with the pretreatment steps, there is very efficient prevention of scaling.

According to EP 0 946 268, an increase of the pH value prior to the reverse osmosis unit is preferably effected by addition of alkali. However, a drawback therein is that a constant need of high-purity alkali has to be satisfied. Beyond doubt, a more advantageous feature would be that an increase of the pH value prior to reverse osmosis could be obtained without use of additional chemicals.

The present invention is based on the problem to provide an improved process for treatment of water using a reverse osmosis device. With such a method, the addition of chemicals, in particular for pH value increase, should be avoided as far as possible. Besides, the process should be most simple to allow manufacture of water treatment devices of most simple structural design and thus reliable performance.

The problem is solved by the process presenting the features of claim 1 as well as the system presenting the features of claim 11. Preferred embodiments of the process according to the invention are specified in the dependent claims 2 to 10. The wording of all the claims is hereby incorporated into the content of the present description by reference.

The process according to the invention is for treatment of salt containing water (raw untreated water) by means of a reverse osmosis device. In particular, the process according to the invention is capable of producing ultrapure water, as needed for use in the above mentioned pharmaceutical utilizations or for applications in semiconductor production.

Before the raw untreated water is purified in the reverse osmosis device, the water is pretreated, and namely in a way that in one process step (preferably the first process step) part of the cations included in the water stream are exchanged for $H^+$ ions. Preferred is that, in particular parallel thereto, in an additional softening step, a part of the cations, in particular the water hardness causing species in the untreated water (like calcium and magnesium ions) are exchanged for "soft" ions, in particular for alkali ions, like sodium and/or potassium ions, for example. In a further step, all the anions included in the water stream are exchanged for hydroxide ions ($OH^-$ ions). Thus, the water stream resulting from said pretreatment includes a defined residual concentration of cations, like sodium or potassium, that have not been substituted by protons. A consequence thereof is that after exchange of the anions included in the water, the water stream is alkaline, since due to the sodium or potassium ions included in the water stream, the hydroxide ions from the anion exchange may not all be neutralized, but remain in the water in the form of sodium or potassium hydroxide solution.

To give a clear definition: the term cation is to cover all positive charged ions, as a matter of principle. Thus, even $H^+$ ions in a water stream are cations. However, when in the present disclosure an exchange of "part of the cations included in a water stream for $H^+$ ions" is addressed, what is meant is that the mass flow of any other positively charged ions, like $Na^+$, $K^+$, $Ca^{2+}$ or $Mg^{2+}$ ions, for example, present in the water stream to be treated is exchanged partially for $H^+$ ions. In that context, the term "cations" is to mean the positive ions present in the water stream (in general said ions are predominantly metallic cations), with the exception of $H^+$ ions. Thus, the water stream resulting from the pretreatment includes both $H^+$ ions and the remainder of non-exchanged other positive ions.

Due to the pretreatment, the pH value of the water to be treated can be increased, without need to add extraneous chemicals to the water stream. The alkaline water stream resulting from the pretreatment can be supplied to the reverse osmosis device immediately, that is, without any intermediate purification and/or treatment steps, where due to the alkalinity of the water stream even hardly ionizable species may be removed.

As already mentioned, the exchange of water hardness causing species is performed in particular parallel to the partial exchange of the cations present in the water stream for $H^+$ ions. Conveniently, to that end the stream of untreated water is split into two partial streams, with one of them passing through a softener device, and the other being treated by means of a cation exchanger operative in parallel to the softener. Subsequently, both streams from the softener and the cation exchanger are combined. The combined water of the two treatments includes both $H^+$ ions and sodium and/or potassium ions.

Thus, the pretreatment within the scope of the process according to the invention comprises in a particular preferred embodiment the following steps:

separating the stream of water into at least two partial streams, treating at least one of the partial streams by means of a cation exchanger operating in the $H^+$ mode, treating at least one further of the partial streams by means of a softener operative in parallel to the cation exchanger, treating the partial streams treated by means of the cation exchanger and the softener by means of at least one anion exchanger operating in the $OH^-$ mode.

While in the at least one partial stream which is treated by means of a cation exchanger operating in the $H^+$ mode, the cations are essentially completely removed (that is, all cations are exchanged for $H^+$ ions), the at least one partial stream which is treated by means of a softener operative in parallel to the cation exchanger, still includes cations. Merely water hardness causing cations, like calcium and magnesium ions were exchanged for soft ions like sodium and potassium ions. Said ions can subsequently not be neutralized by $OH^-$ ions from the anion exchanger, so that the water stream resulting from the pretreatment is alkaline.

Preferably the partial streams treated in the softener and the cation exchanger are united prior to treatment in the at least one anion exchanger.

The parallel arrangement of the softener and the cation exchanger offers the advantage that the pH value of the water stream which is fed into the reverse osmosis device can be controlled in a particularly smart manner. In principle, within the scope of the process according to the invention the pH value of the water stream can be controlled by varying the proportion of cations that are exchanged during the pretreatment. With a parallel arrangement of softener and cation exchanger, the pH value of the water stream may be controlled in a particularly simple manner by varying the ratio in which the water stream is split to the cation exchanger and the softener. As a matter of principle, the greater the proportion of the water stream conducted through the softener, the more alkaline is the resulting water stream.

In conventional systems for the production of ultrapure water by means of reverse osmosis, an alkali metering unit is disposed downstream of cation and anion exchanger steps arranged upstream of the reverse osmosis. Thereby the water is not buffered, that is, smallest amounts of alkali are able to effect an abrupt increase in pH value that is very difficult to control and above all generally causes damage to the reverse osmosis membrane at a pH peak of more than 13. According to the present invention, merely the ratio of softener stream to cation exchanger stream is mixed, the regulation is very stable throughout a wide range, and thus the pH value may be adjusted very exactly. For example, if with an untreated water stream of 100 m³/h having a hardness of 20° dH (German degree of hardness), a partial stream of 5 m³/h is softened and if parallel thereto with 95 m³/h cations are exchanged in a cation exchanger for $H^+$ ions, then a pH value of pH=10,54 will be obtained in the subsequent anion exchanger step. With 10 m³/h softening and 90 m³/h cation exchange, the obtained pH value is 10,84.

In preferred embodiments of the process according to the invention between 75 and 99% by volume, preferably between 90 and 99% by volume of the water stream are treated using the cation exchanger.

Furthermore preferred is that between 1 and 25% by volume, preferably between 1 and 10% by volume of the water stream are treated using the softener.

In a particularly preferred embodiment, the pH value of the water stream which is fed into the reverse osmosis device is adjusted to a value >9, preferably >10, particularly preferred between 10 and 11.

In preferred embodiments, even the pH value of the water stream input into the anion exchanger can be selectively adjusted. With particular advantage said adjustment can be effected by diverting water output from the anion exchanger and adding it to the water stream prior to input into the anion exchanger.

The cation exchangers, anion exchangers and softeners to be used in the process according to the invention are all commercially available standard components for water treatment systems that do not need to be explained in detail.

A particularly preferred cation exchanger employed is an ion exchanger based on a strongly acid ion exchanger resin. Cation exchangers adapted to let water hardness related alkalinity (bicarbonate alkalinity) pass, are particularly preferred.

A preferred anion exchanger employed is an ion exchanger based on a strongly alkaline ion exchanger resin. Operation of the anion exchanger in the $OH^-$ mode is particularly preferred. In addition or as an alternative, anion exchangers in the carbonate mode may be employed.

The softener used within the scope of the process according to the invention, is preferably a softener operated in the $Na^+$ or $K^+$ mode.

Also an object of the present invention is a system for treating water in which in particular the process according to the invention may be carried out. Correspondingly, the system according to the invention is of course particularly well adapted to the production of ultrapure water for the above mentioned purposes.

A system according to the invention comprises a reverse osmosis device and a feed line to said reverse osmosis device composed of at least two partial sections arranged in parallel to each other. At least one of the partial sections includes a cation exchanger, at least another comprises a softener. All the partial sections arranged in parallel to each other are passed by a part of the water to be treated. Splitting the water stream into partial streams can be effected by means of a Y branch or by means of a deflector adjustable relative to the obtained partial volume streams, for example.

Furthermore, the system according to the invention comprises an anion exchanger arranged downstream of the parallel partial sections or arranged upstream of the reverse osmosis. In other words, the anion exchanger is arranged between the parallel partial sections and the reverse osmosis device, and is passed by the water to be treated, after the water has passed the parallel partial sections. Preferably the water from the parallel partial sections is combined, prior to its feeding into the anion exchanger. Of course, as a matter of principle, there is also an option that both the partial streams may be treated in separate anion exchangers and combined not earlier than at the output thereof.

In relation to the function of the individual components of the system according to the invention, reference is made to corresponding explanations of said components related to the process according to the invention.

The above mentioned adjustment of a pH value by means of a softener and a cation exchanger arranged in parallel thereto may of course be implemented irrespective of the fact whether or not a reverse osmosis device is arranged downstream of the two components. Correspondingly, a process for control of the pH value of a water stream is an object of the present invention. In the broadest sense, the method comprises the steps of exchanging part of the cations included in the water stream by $H^+$ ions, and the essentially complete exchange of the anions included in the water stream by OH⁺ ions. Preferably, for exchange of the cations and the anions the water stream is split into at least two partial streams, and at least one thereof is treated by means of a cation exchanger operating in the H⁺ mode, and at least one other is treated by means of a softener arranged in parallel to the cation exchanger. The partial streams treated by means of the cation exchanger and the softener are treated using an anion exchanger operating in the OH⁻ mode. For controlling the pH value, the ratio in which the water stream is split to the cation exchanger and the softener is varied.

Further features of the invention will become obvious from the following description of preferred embodiments in connection with the drawings and the dependent claims. Herein the individual features may be realized standing alone or in combinations. The described embodiments are intended for illustration and better understanding of the invention, and are in no way intended to be limiting.

DESCRIPTION OF THE DRAWINGS

FIG. 1 shows a schematic diagram illustrating the process according to the invention.

The principle of the process according to the invention is well illustrated in FIG. 1. Left hand on top of the illustration, a raw untreated water stream is input and split into two partial streams at point 101. One of the partial streams (in general about 5% of the raw water stream) passes a softener 102, preferably operated in the sodium or potassium mode, and wherein water hardness causing cations are removed essentially completely. Accordingly, the water output from the softener 102 includes but soft cations, like sodium or potassium ions, and is neutral, as a general rule (at least when the input untreated water stream has a neutral pH value). The second partial stream is fed into a cation exchanger 103 arranged in parallel to the softener 102. Said exchanger is preferably operated in the H⁺ mode. Therein, essentially the total of cations included in the untreated water are substituted by protons. The water output from the cation exchanger 103 is correspondingly acid. At point 104 both the partial streams are combined and fed into an anion exchanger 105. In said exchanger, the total of anions included in the water are exchanged for hydroxide ions (OH⁻ ions). However, since merely a part of the hydroxide ions can be neutralized by the protons coming from the cation exchanger 103 (in the softener 102, water hardness causing cations were not substituted by protons, but merely exchanged for softer cations), the water output from the anion exchanger 105 is alkaline, as a general rule. In preferred embodiments, the pH value of the untreated water can be modified, immediately before it is fed into the anion exchanger 105. Thus, to increase the pH value, alkali can be added to the water to be fed to the anion exchanger 105 at point 106. Said addition can be effected, for example, by supplying water output from the anion exchanger 105 by means of pump 108 via recirculating duct 107 to the water stream input into the anion exchanger 105. The water output from the anion exchanger 105 is finally fed into a reverse osmosis device 109 in which low ionizable species may be removed efficiently, due to the high pH value of the water.

The invention claimed is:

1. A process for producing ultrapure water, in which a stream of water is purified in a reverse osmosis device, wherein the water stream is subject to a pretreatment comprising:
   splitting the water stream into at least two partial streams,
   exchange of cations present in at least one of the partial streams for H+ ions by a cation exchanger operated in the H+ mode, and
   exchange of the hardness causing species present in at least one further of the partial streams for soft ions by a softener operative in parallel to the cation exchanger, and
   treating the partial streams treated by the cation exchanger and the softener by at least one anion exchanger operating in the OH– mode,
   and wherein the water stream obtained from the pretreatment is fed into the reverse osmosis device.

2. The process according to claim 1, wherein the treated partial streams are combined prior to treatment by means of the at least one anion exchanger.

3. The process according to claim 1, wherein between 75 and 99% by volume of the water stream are treated using the cation exchanger.

4. The process according to claim 1, wherein between 90 and 99% by volume of the water stream are treated using the cation exchanger.

5. The process according to claim 1, wherein between 1 and 25% by volume of the water stream are treated using the softener.

6. The process according to claim 1, wherein between 1 and 10% by volume of the water stream are treated using the softener.

7. The process according to claim 1, wherein a pH value of the water stream which is fed into the reverse osmosis device is controlled by varying the proportion of cations that are exchanged for H+ ions during the pretreatment.

8. The process according to claim 1, wherein a pH value of the water stream which is fed into the reverse osmosis device is controlled by varying the ratio in which the water stream is split to the cation exchanger and the softener.

9. The process according to claim 1, wherein for adjusting a pH value of the water stream feeded into the anion exchanger, water output from the anion exchanger is diverted and added to the water stream prior to input into the anion exchanger.

10. The process according to claim 1, wherein the cation exchanger is adapted to let water hardness related alkalinity (bicarbonate alkalinity) pass.

11. A system for producing ultrapure water according to a process according to claim 1, comprising a reverse osmosis device, a feed line to said reverse osmosis device composed of at least two partial sections arranged in parallel to each other, at least one of the partial sections including a cation exchanger, at least another including a softener, each passed by part of the water to be treated, and an anion exchanger arranged downstream of the parallel partial sections and arranged upstream of the reverse osmosis device.

* * * * *